United States Patent
Iwasaki et al.

(10) Patent No.: US 11,859,582 B2
(45) Date of Patent: Jan. 2, 2024

(54) ENGINE INTAKE SOUND AMPLIFIER

(71) Applicant: Mazda Motor Corporation, Hiroshima (JP)

(72) Inventors: Yousuke Iwasaki, Aki-gun (JP); Satoshi Kusumoto, Aki-gun (JP); Shin Kodama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 18/071,873

(22) Filed: Nov. 30, 2022

(65) Prior Publication Data
US 2023/0184201 A1 Jun. 15, 2023

(30) Foreign Application Priority Data
Dec. 14, 2021 (JP) .................. 2021-202639

(51) Int. Cl.
*F02M 35/16* (2006.01)
*F02M 35/12* (2006.01)
*F02B 37/16* (2006.01)

(52) U.S. Cl.
CPC ...... *F02M 35/161* (2013.01); *F02M 35/1294* (2013.01); *F02B 37/16* (2013.01)

(58) Field of Classification Search
CPC ............. F02M 35/161; F02M 35/1294; F02M 35/10157; F02D 41/0077; F02D 41/0002; F02B 37/16; F02B 37/24
See application file for complete search history.

(56) References Cited

U.S. PATENT DOCUMENTS

| 7,975,802 B2 * | 7/2011 | Yokoya | ............ F02M 35/10295 |
| | | | 181/271 |
| 8,127,888 B1 * | 3/2012 | Mah | ...................... G10K 11/22 |
| | | | 123/184.53 |
| 2022/0381211 A1 * | 12/2022 | Kodama | ............ F02M 35/1294 |

FOREIGN PATENT DOCUMENTS

| JP | 2008057528 A | * | 3/2008 |
| JP | 6319253 B2 | | 5/2018 |

* cited by examiner

*Primary Examiner* — Syed O Hasan
(74) *Attorney, Agent, or Firm* — Alleman Hall Creasman & Tuttle LLP

(57) ABSTRACT

An intake sound amplifier amplifies intake sound that is transmitted from an engine mounted in an engine compartment of a vehicle to a cabin. The intake sound amplifier includes a first passage branched from an intake passage, through which intake air is introduced into an engine; a device body that includes a vibrating body vibrated by pulsation of the intake air and is connected to a downstream end of the first passage; and a second passage that is connected to a downstream end of the device body and extends to the cabin side. The device body is located outward in a vehicle width direction of a side frame that extends in a vehicle front-rear direction and separates inside of the engine compartment from outside in the vehicle width direction.

12 Claims, 3 Drawing Sheets

ENGINE INTAKE SOUND AMPLIFIER

TECHNICAL FIELD

The present disclosure relates to an engine intake sound amplifier.

BACKGROUND ART

An intake sound amplifier for amplifying intake sound that is transmitted from an engine mounted in an engine compartment of a vehicle to a cabin has been known. For example, an intake sound amplifier disclosed in JP2017-066930A includes a first passage that is branched from a portion on an upstream side of a throttle valve in an intake pipe for supplying fresh air to the engine, a vibration section that is provided to an opposite end of the first passage from the intake pipe, a second passage whose one end is connected to the vibration section and whose other end opposes the cabin, and a sound deadening section that is provided in an intermediate portion of the second passage.

SUMMARY OF THE INVENTION

Problem to be Solved by the Invention

The intake sound amplifier is usually arranged in the engine compartment. In addition, the intake sound amplifier amplifies the intake sound at a specified frequency, which is set in advance.

However, in the case where the intake sound amplifier is arranged in the engine compartment, radiant heat from the engine is transferred to the intake sound amplifier. As a result, an amplification frequency of the intake sound by the intake sound amplifier is changed.

In addition, various types of equipment such as intake/exhaust systems and a reduction drive are arranged in the engine compartment. Thus, even when it is attempted to arrange the intake sound amplifier in the engine compartment, only a small arrangement space is available, which makes it difficult to freely design sizes (a size of the vibration section, a length of the passage, and the like) of the intake sound amplifier. Here, the sizes of the intake sound amplifier affect performance (for example, the amplification frequency and the like) of the intake sound amplifier.

The present disclosure has been made in view of such a point and therefore has a purpose of suppressing a change in an amplification frequency of intake sound, which is caused by radiant heat from an engine, in an intake sound amplifier while increasing a degree of freedom in layout of the intake sound amplifier.

Means for Solving the Problem

An intake sound amplifier according to the present disclosure is an engine intake sound amplifier for amplifying intake sound that is transmitted from an engine mounted in an engine compartment of a vehicle to a cabin, and includes a first passage branched from an intake passage through which intake air is introduced into the engine, a device body that includes a vibration body vibrated by pulsation of the intake air and is connected to a downstream end portion of the first passage, and a second passage that is connected to a downstream end portion of the device body and extends toward the cabin. A side frame extends in a vehicle front-rear direction and separates an inside of the engine compartment from an outside in the vehicle width direction. At least a part of the device body is located outward in the vehicle width direction of the side frame.

As it has been described so far, the device body of the intake sound amplifier is arranged outward in the vehicle width direction of the side frame. Thus, radiant heat from the engine is blocked by the side frame and is less likely to be transferred to the vibration body included in the device body. In this way, it is possible to suppress a change in an amplification frequency of the intake sound, which is caused by an influence of the radiant heat from the engine.

In addition, the device body of the intake sound amplifier is arranged outward in the vehicle width direction of the side frame, that is, outside of the engine compartment. Thus, a size of the intake sound amplifier (a size of the device body, lengths and thicknesses of the first passage and the second passage, and the like), which relates to performance of the intake sound amplifier, can be designed relatively freely without considering interference with various types of equipment arranged in the engine compartment. That is, a degree of freedom in layout of the intake sound amplifier is increased.

As it has been described so far, in regard to the intake sound amplifier, it is possible to suppress a change in an amplification frequency of the intake sound, which is caused by radiant heat from the engine, and to increase the degree of freedom in layout thereof.

In an embodiment, the device body is located at an overlapping position with the side frame when seen in the vehicle width direction.

This is further advantageous for suppressing the change in the amplification frequency of the intake sound, which is caused by the radiant heat from the engine.

In an embodiment, at least part of the first passage is located outward in the vehicle width direction of the side frame.

According to the above embodiment, the first passage can be protected from the radiant heat of the engine, which is further advantageous for suppressing the change in the amplification frequency of the intake sound. In addition, it is possible to increase a degree of freedom in layout of the first passage.

In an embodiment, the first passage is connected to the device body through a lower side of the side frame.

According to the above embodiment, it is possible to further increase the degree of freedom in layout of the first passage by effectively using a space under the side frame.

In an embodiment, the second passage includes an outer portion that is arranged outward in the vehicle width direction of the side frame and an inner portion that is arranged inward in the vehicle width direction of the side frame, and a passage length of the outer portion is longer than a passage length of the inner portion.

According to the above embodiment, it is possible to further increase a degree of freedom in layout of the second passage by arranging a large portion of the second passage outward in the vehicle width direction of the side frame.

In an embodiment, at least a part of the device body is located inward in the vehicle width direction of a fender panel.

According to the above embodiment, a dead space between the side frame and the fender panel (inside of the fender) can effectively be used to arrange the intake sound amplifier therein.

Advantage of the Invention

According to the present disclosure, in regard to the intake sound amplifier, it is possible to suppress a change in an amplification frequency of the intake sound, which is caused by the radiant heat from the engine, and to increase the degree of freedom in layout thereof.

MODES FOR CARRYING OUT THE INVENTION

A detailed description will hereinafter be made on an embodiment of the present disclosure with reference to the drawings. The following description on the preferred embodiment is essentially and merely illustrative and thus has no intention to limit the present disclosure, application subjects thereof, and application thereof at all.

Figure 1:
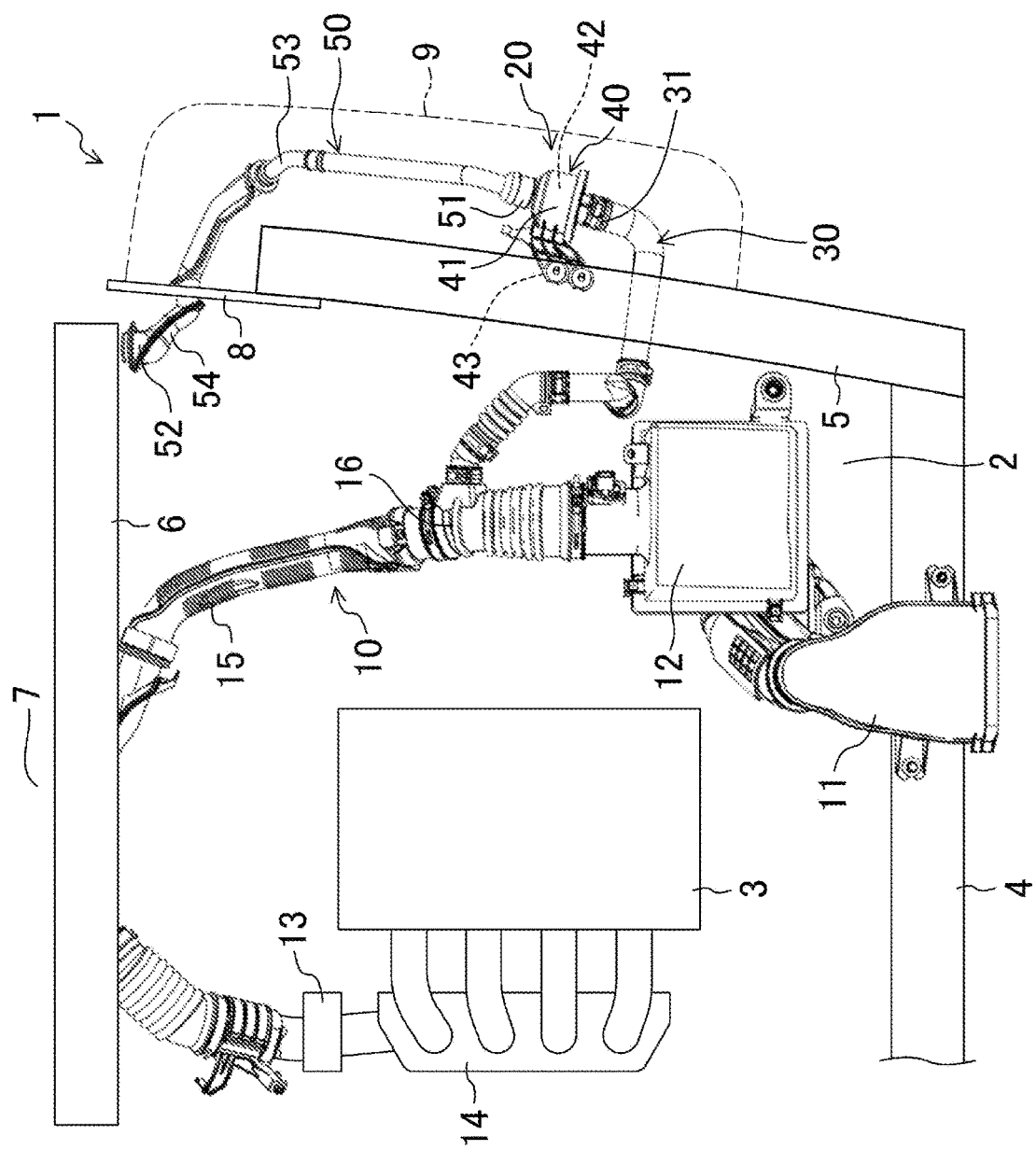
FIG. 1 is a plan view of a vehicle front portion including an intake sound amplifier.

FIG. 1 is a plan view in which a front portion of a vehicle 1 including an intake sound amplifier 20, which will be described below, is seen from above. As illustrated in FIG. 1, an engine 3 is mounted in an engine compartment 2 in the front portion of the vehicle 1. The engine 3 is a vertically-mounted multicylinder engine in which a plurality of cylinders (not illustrated) are aligned in a vehicle front-rear direction (an up-down direction in FIG. 1). Although not illustrated, a reduction drive is coupled to the engine 3 in the engine compartment 2. In addition, although not illustrated, a supercharger, a motor, a battery, and the like are also accommodated in the engine compartment 2.

The engine compartment 2 is divided by a front crossmember 4 that extends in a vehicle width direction (a right-left direction in FIG. 1) on a vehicle front side, right and left side frames (front side members) 5 that extend in the vehicle front-rear direction on both sides in the vehicle width direction, and a dashboard 6 that extends in the vehicle width direction on a vehicle rear side of the front crossmember 4. FIG. 1 only illustrates the side frame 5 on the left side in the vehicle width direction when seen in a vehicle advancing direction.

The front crossmember 4 and the dashboard 6 separate the inside of the engine compartment 2 from the outside in the vehicle front-rear direction. In particular, the dashboard 6 separates the engine compartment 2 from a cabin 7. The side frame 5 separates the inside of the engine compartment 2 from the outside in the vehicle width direction. The side frame 5 is made of a steel material such as channel steel, H-steel, or square tube steel. The side frame 5 extends in the vehicle front-rear direction from an end portion in the vehicle width direction of the front crossmember 4 to the vicinity of the dashboard 6.

A plate 8 is attached to a surface on an inner side in the vehicle width direction of an end portion on the vehicle rear side of the side frame 5. The plate 8 is arranged such that a thickness direction thereof matches the vehicle width direction. In the vehicle front-rear direction, the plate 8 is arranged between the side frame 5 and the dashboard 6. The side frame 5 and the plate 8 are located at substantially the same position in the vehicle width direction.

A fender panel 9 (indicated by a two-dot chain line in FIG. 1) is provided outward in the vehicle width direction of the side frame 5. The fender panel 9 covers a wheel (in detail, a front wheel, which is not illustrated) to protect an occupant and a pedestrian from the rotating wheel itself or a stone, mud, water, or the like hitting or splashing up by the wheel. The fender panel 9 is also an outer panel that is arranged in an outer end portion in the vehicle width direction of the vehicle 1.

In the vehicle width direction, a clearance (space) is provided between the side frame 5 and the fender panel 9.

The engine 3 includes an intake passage 10 through which intake air (fresh air) is introduced into the engine 3. The intake passage 10 includes an intake duct 11 that suctions the intake air; an air cleaner 12 that filters the intake air, a throttle valve 13 that regulates an intake amount, an intake manifold 14, from which the intake air is introduced into each of the cylinders in the engine 3, and an intake pipe 15 through which the intake air flows from the intake duct 11 to the intake manifold 14. The intake passage 10 is located inward in the vehicle width direction of the side frame 5. Although not illustrated, an exhaust passage is connected to the engine 3.

The engine 3 includes the intake sound amplifier 20. The intake sound amplifier 20 amplifies intake sound that is transmitted from the engine 3 mounted in the engine compartment 2 to the cabin 7. The intake sound amplifier 20 includes a first passage 30, a device body 40, and a second passage 50.

The first passage 30 is branched from the intake passage 10. The device body 40 is connected to a downstream side of the first passage 30. The second passage 50 is connected to a downstream side of the device body 40.

The first passage 30 is tubular and made of the resin. The first passage 30 is branched from a branch section 16, which is located between the air cleaner 12 and the throttle valve 13, in the intake pipe 15. The first passage 30 extends from the branch section 16 to the outer side in the vehicle width direction of the side frame 5 through a lower side of the side frame 5, and then further extends to the rear of the vehicle.

Here, although a detailed description will be made below, the device body 40 is located outward in the vehicle width direction of the side frame 5. That is, the first passage 30 is connected to the device body 40 through the lower side of the side frame 5. In addition, a downstream end portion 31 of the first passage 30 is located outward in the vehicle width direction of the side frame 5.

Figure 2:
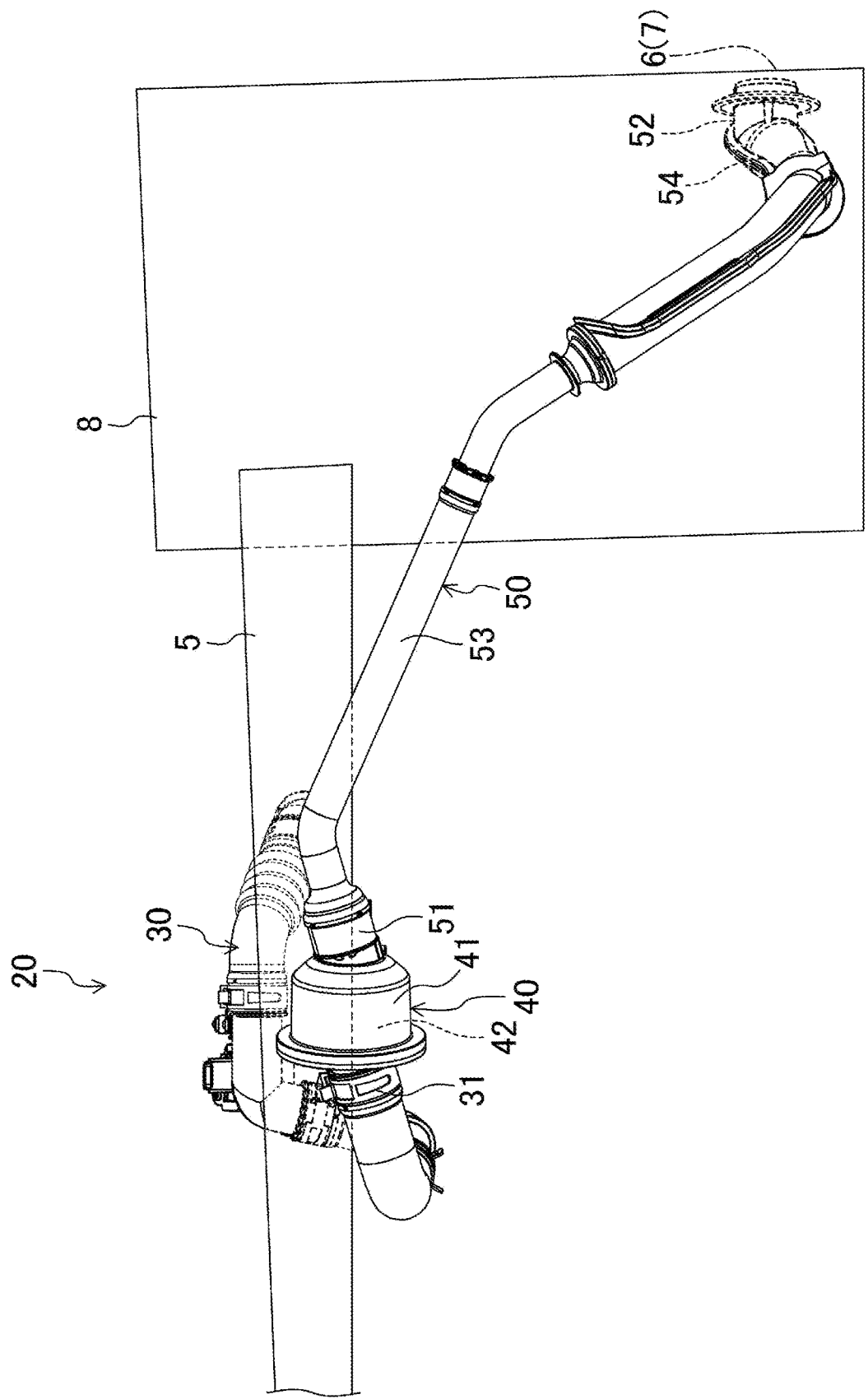
FIG. 2 is a side view of the intake sound amplifier.
Figure 3:
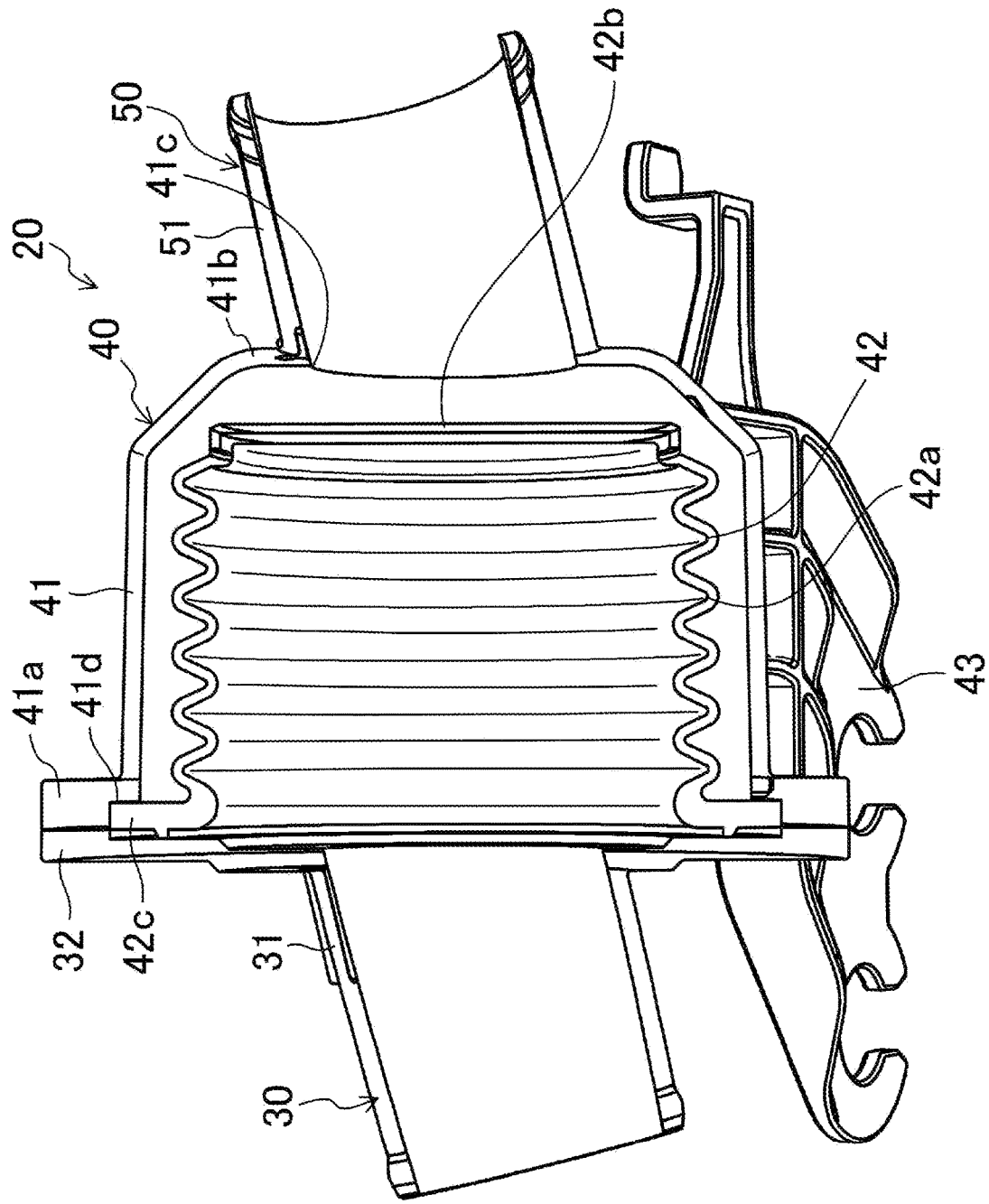
FIG. 3 is a vertical cross-sectional view of the intake sound amplifier.

FIG. 2 is a side view in which the intake sound amplifier 20 is seen from the left side. FIG. 3 is a vertical cross-sectional view of the intake sound amplifier 20. As illustrated in FIGS. 2 and 3, the downstream end portion 31 of the first passage 30 is inclined in a manner to extend upward as extending to the vehicle rear side (the downstream side). A flange 32 is provided to an opening edge in the downstream end portion 31 of the first passage 30.

As illustrated in FIG. 1, as described above, the device body 40 is located outward in the vehicle width direction of the side frame 5. In addition, the device body 40 is located inward in the vehicle width direction of the fender panel 9. That is, the device body 40 is located between the side frame 5 and the fender panel 9 in the vehicle width direction. The device body 40 is connected to the downstream end portion 31 (downstream side) of the first passage 30.

As illustrated in FIG. 2, a part of the device body 40 is located at an overlapping position with the side frame 5 when seen in the vehicle width direction. In other words, the device body 40 is located at the same height as the side frame 5.

As illustrated in FIG. 3, the device body 40 has a housing 41, a vibration body (resonator) 42, and an attachment section 43. The housing 41 has a bottomed cylindrical shape that is opened to the vehicle front side (upstream side). A flange 41a is provided to an opening edge on the vehicle front side of the housing 41. The housing 41 and the downstream end portion 31 of the first passage 30 are mutually connected by the flanges 32, 41a. An opening 41c is provided to a bottom wall section 41b on the vehicle rear side (downstream side) of the housing 41. The cylindrical housing 41 extends horizontally in the vehicle front-rear direction. The housing 41 is made of the resin.

The vibration body 42 has a bottomed cylindrical shape that is opened to the vehicle front side (upstream side), and is accommodated in the housing 41. The vibration body 42 includes a cylindrical section 42a, a bottom wall section 42b, and a flange 42c. The vibration body 42 is made of rubber. The vibration body 42 is formed in a membrane shape.

Similar to the housing 41, the cylindrical section 42a extends horizontally in the vehicle front-rear direction. The cylindrical section 42a is formed in an elastically deformable accordion shape. The bottom wall section 42b covers an opening on the vehicle rear side of the cylindrical section 42a. The bottom wall section 42b faces the opening in the downstream end portion 31 of the first passage 30. The flange 42c is provided to an opening edge on the vehicle front side of the cylindrical section 42a. The flange 42c is fitted to a recessed section 41d that is provided to the flange 41a of the housing 41. In this way, the vibration body 42 is fixed to the housing 41.

Since the cylindrical section 42a is formed in the accordion shape, the bottom wall section 42b of the vibration body 42 vibrates (membrane-vibrates) by pulsation (a pressure wave) of the intake air that is branched from the intake passage 10 and flows into the device body 40 via the first passage 30. Since the vibration body 42 vibrates by the pulsation of the intake air, the intake sound is resonated and amplified in a particular frequency band.

The attachment section 43 is fixed to an outer peripheral portion of the housing 41. Since the attachment section 43 is fixed to a lower surface of the side frame 5, the body device 40 is attached to the side frame 5.

The second passage 50 has a tubular shape and is made of the resin. As illustrated in FIGS. 2 and 3, an upstream end portion 51 of the second passage 50 is connected to the opening 41c of the housing 41 in the device body 40. That is, the upstream end portion 51 of the second passage 50 is located outward in the vehicle width direction of the side frame 5. Similar to the downstream end portion 31 of the first passage 30, the upstream end portion 51 of the second passage 50 is inclined in the manner to extend upward as extending to the vehicle rear side (downstream side). The upstream end portion 51 of the second passage 50 may integrally formed with the housing 41 of the device body 40.

As illustrated in FIGS. 1 and 2, the second passage 50 extends from the opening 41c of the housing 41 to the vehicle rear side, that is, the cabin 7 side. In detail, the second passage 50 extends from the opening 41c of the housing 41 to the vehicle rear side and the upper side, is then bent, and extends to the vehicle rear side and the lower side. Thereafter, the second passage 50 is further bent, extends to the inner side in the vehicle width direction, and is then bent to the vehicle rear side. That is, an opening in a downstream end portion 52 of the second passage 50 faces the cabin 7. In addition, the opening in the downstream end portion 52 of second passage 50 is located near the dashboard 6. Although a detailed description will be made below, the downstream end portion 52 of the second passage 50 is located inward in the vehicle width direction of the side frame 5.

As illustrated in FIG. 1, the second passage 50 includes an outer portion 53 and an inner portion 54. The outer portion 53 is arranged outward in the vehicle width direction of the plate 8. The inner portion 54 is arranged inward in the vehicle width direction of the plate 8. Here, as described above, the side frame 5 and the plate 8 are located at substantially the same position in the vehicle width direction. Accordingly, in other words, the outer portion 53 is arranged outward in the vehicle width direction of the side frame 5. The inner portion 54 is arranged inward in the vehicle width direction of the side frame 5.

In the second passage 50, the outer portion 53 and the inner portion 54 are made of mutually different members as being separated by the plate 8. In order to communicate the outer portion 53 and the inner portion 54 with each other, the plate 8 is provided with a hole (not illustrated). The upstream end portion 51 is included in the outer portion 53. The downstream end portion 52 is included in the inner portion 54.

In the second passage 50, a passage length of the outer portion 53 is longer than a passage length of the inner portion 54.

As it has been described so far, according to this embodiment, the device body 40 of the intake sound amplifier 20 is arranged outward in the vehicle width direction of the side frame 5. Thus, radiant heat from the engine 3 is blocked by the side frame 5 and is less likely to be transferred to the vibration body 42 included in the device body 40. In this way, it is possible to suppress a change in an amplification frequency of the intake sound, which is caused by an influence of the radiant heat (radiation heat) from the engine 3.

In detail, it is possible to suppress the change in the amplification frequency of the intake sound by suppressing modification of the rubber vibration body 42 and modification of the resinous first passage 30 and the resinous second passage 50, which are caused by the radiant heat from the engine 3.

In addition, the device body 40 of the intake sound amplifier 20 is arranged outward in the vehicle width direction of the side frame 5, that is, on the outside of the engine compartment 2. Thus, a size of the intake sound amplifier 20 (a size of the device body 40, lengths and thicknesses of the first passage 30 and the second passage 50, and the like), which relates to performance of the intake sound amplifier 20, can be designed relatively freely without considering interference with various types of equipment (for example, intake/exhaust systems, the reduction drive, and the like) arranged in the engine compartment 2.

As it has been described so far, in regard to the intake sound amplifier 20, it is possible to suppress the change in the amplification frequency of the intake sound, which is caused by the radiant heat from the engine 3, and to increase the degree of freedom in layout thereof.

Since the device body 40 of the intake sound amplifier 20 is located at the overlapping position with the side frame 5 when seen in the vehicle width direction, which is further advantageous for suppressing the change in the amplification frequency of the intake sound, which is caused by the radiant heat from the engine 3.

Apart of the first passage 30, more specifically, the downstream end portion 31 thereof is located outward in the vehicle width direction of the side frame 5. In this way, the first passage 30 can be protected from the radiant heat of the engine 3, which is further advantageous for suppressing the change in the amplification frequency of the intake sound. In addition, it is possible to increase the degree of freedom in layout of the first passage 30.

Since the first passage 30 is connected to the device body 40 through the lower side of the side frame 5, it is possible to further increase the degree of freedom in layout of the first passage 30 by effectively using a space under the side frame 5.

The passage length of the outer portion 53 in the second passage 50 is longer than the passage length of the inner portion 54 thereof. Thus, it is possible to further increase the degree of freedom in layout of the second passage 50 by arranging a large portion of the second passage 50 outward in the vehicle width direction of the side frame 5.

The device body 40 is located inward in the vehicle width direction of the fender panel 9. Thus, a dead space between the side frame 5 and the fender panel 9 (inside of a fender) can effectively be used to arrange the intake sound amplifier 20 therein.

The present disclosure has been described so far in terms of the preferred embodiment. However, such descriptions are not limiting matters, and various modifications can be made thereto.

A part of the device body 40 of the intake sound amplifier 20 may be located directly under the side frame 5. That is, at least a part of the device body 40 only needs to be located outward in the vehicle width direction of the side frame 5. At a location inward in the vehicle width direction of the side frame 5, the first passage 30 may be connected to the device body 40.

The first passage 30 may be connected to the device body 40 through the upper side of the side frame 5. A device such as a sound deadening device may be provided in the middle of the second passage 50.

The plate 8 may not be provided.

INDUSTRIAL APPLICABILITY

The present disclosure can be applied to the engine intake sound amplifier. Thus, the present disclosure is extremely useful and has high industrial applicability.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Engine compartment
3 Engine
5 Side frame
6 Dashboard
7 Cabin
8 Plate
9 Fender panel
10 Intake passage
20 Intake sound amplifier
30 First passage
40 Device body
41 Housing
42 Vibration body
50 Second passage
53 Outer portion
54 Inner portion

The invention claimed is:

1. An engine intake sound amplifier for amplifying intake sound that is transmitted from an engine mounted in an engine compartment of a vehicle to a cabin, the engine intake sound amplifier comprising:
   a first passage branched from an intake passage through which intake air is introduced into the engine;
   a device body that includes a vibration body vibrated by pulsation of the intake air and is connected to a downstream end portion of the first passage; and
   a second passage that is connected to a downstream end portion of the device body and extends toward the cabin, wherein
   a side frame extends in a vehicle front-rear direction and separates an inside of the engine compartment from an outside in the vehicle width direction,
   at least a part of the device body is located outward in a vehicle width direction of the side frame,
   the second passage includes:
      an outer portion that is arranged outward in the vehicle width direction of the side frame; and
      an inner portion that is arranged inward in the vehicle width direction of the side frame, and
      a passage length of the outer portion is longer than a passage length of the inner portion.

2. The engine intake sound amplifier according to claim 1, wherein
   the device body is located at an overlapping position with the side frame when seen in the vehicle width direction.

3. The engine intake sound amplifier according to claim 2, wherein
   at least a part of the first passage is located outward in the vehicle width direction of the side frame.

4. The engine intake sound amplifier according to claim 3, wherein
   the first passage is connected to the device body through a lower side of the side frame.

5. The engine intake sound amplifier according to claim 4, wherein
   at least part of the device body is located inward in the vehicle width direction of a fender panel.

6. The engine intake sound amplifier according to claim 1, wherein
   at least a part of the first passage is located outward in the vehicle width direction of the side frame.

7. The engine intake sound amplifier according to claim 1, wherein
   at least a part of the device body is located inward in the vehicle width direction of a fender panel.

8. The engine intake sound amplifier according to claim 2, wherein
   at least a part of the device body is located inward in the vehicle width direction of a fender panel.

9. The engine intake sound amplifier according to claim 3, wherein
   at least a part of the device body is located inward in the vehicle width direction of a fender panel.

10. The engine intake sound amplifier according to claim 6, wherein
    the first passage is connected to the device body through a lower side of the side frame.

11. The engine intake sound amplifier according to claim 6, wherein
    at least a part of the device body is located inward in the vehicle width direction of a fender panel.

12. The engine intake sound amplifier according to claim 10, wherein at least a part of the device body is located inward in the vehicle width direction of a fender panel.

* * * * *